United States Patent [19]
Dorai et al.

[11] Patent Number: 4,954,658
[45] Date of Patent: Sep. 4, 1990

[54] PROCESS FOR REDUCING FLUORIDE LEVELS IN POLY(TETRAMETHYLENE ETHER) GLYCOL

[75] Inventors: Suriyanarayanan Dorai, Lockport, N.Y.; Richard E. Ernst, Kennett Square, Pa.

[73] Assignee: E. I. du Pont de Nemours and Company, Wilmington, Del.

[21] Appl. No.: 407,067

[22] Filed: Sep. 14, 1989

Related U.S. Application Data

[63] Continuation-in-part of Ser. No. 195,911, May 19, 1988, abandoned.

[51] Int. Cl.$^5$ .................. C07L 37/72; C07L 37/70
[52] U.S. Cl. ........................... 568/617; 568/621
[58] Field of Search ........................... 568/617, 621

[56] References Cited

U.S. PATENT DOCUMENTS

| 2,751,419 | 6/1956 | Hill et al. | 568/617 |
| 3,925,484 | 12/1975 | Baker | 568/617 |
| 4,115,408 | 4/1978 | Baker | 568/617 |
| 4,371,713 | 2/1983 | Matsumoto et al. | |

Primary Examiner—Howard T. Mars

[57] ABSTRACT

A process for reducing fluoride levels in PTMEG by heating aqueous PTMEG having an undesired level of fluoride (80'600 ppm) to a temperature in the range between about 200° and 300° C. for a period of time sufficient to reduce the fluoride content of said PTMEG. Preferably, heating is carried out with agitation to a temperature between about 225° and about 275° C. for about 1 minute to about 8 hours in the presence of an aqueous base, most preferably 240° to 250° C. in presence of aqueous lime.

20 Claims, No Drawings

PROCESS FOR REDUCING FLUORIDE LEVELS IN POLY(TETRAMETHYLENE ETHER) GLYCOL

CROSS-REFERENCE TO RELATED APPLICATION

This application is a continuation-in-part of application Ser. No. 07/195,911 filed May 19, 1988.

FIELD OF THE INVENTION

The present invention relates to a process for reducing fluoride levels in poly(tetramethylene ether) glycol (PTMEG) by heating aqueous PTMEG to an elevated temperature.

BACKGROUND OF THE INVENTION

PTMEG is frequently manufactured by polymerizing tetrahydrofuran (THF) in the presence of a fluorosulfonic acid catalyst. A major use of PTMEG is as a component of certain polyester elastomers. Some of these elastomers are the reaction products of, among other things, terephthalic acid (TPA) and PTMEG. When one reacts TPA with PTMEG prepared in the presence of fluorosulfonic acid, undesirable amounts of HF can be generated. In order to reduce HF evolution in the reaction with TPA, it is necessary to use a PTMEG which has a low concentration of fluoride.

U.S. Pat. No. 4,371,713 discloses a process for manufacturing PTMEG comprising (A) polymerizing THF in the presence of fluorosulfuric acid, (B) adding water or an aqueous solution of an alkaline material to the polymerization product and heating that system under strongly acidic conditions to hydrolyze the polymerization product. The alkaline material is preferably the hydroxide or oxide of an alkali metal, but the hydroxide or oxide of an alkaline earth metal or ammonia may be used. The hydrolysis temperature is preferably between 50° C. and 150° C. If the temperature exceeds 150° C., decomposition or deterioration of the PTMEG is disclosed as tending to take place, and the depolymerizing action of sulfuric acid and hydrofluoric acid is intensified. The hydrolysis treatment time is usually 1 to 10 hours.

U.S. Pat. No. 3,358,042 discloses a process for recovering from an aqueous acidic solution PTMEG which had been produced via a catalytic polymerization of THF (the preferred catalysts are hydrofluoric and sulfuric acids). Polymerization was terminated by the addition of water, and the polymerization termination products, i.e., PTMEG, THF, catalyst and water, were steam-distilled until they reach a temperature of 95° C., so that the unreacted THF was removed therefrom. A water-immiscible polymer solvent was added to the mixture produced by steam distillation; i.e., PTMEG, catalyst and water. The mixture of PTMEG, solvent, catalyst and some water separate into a PTMEG-solvent phase and an aqueous phase. A neutralizer, preferably calcium hydroxide, calcium carbonate or mixtures of the two, is added to the solvent phase in a quantity which is in stoichiometric excess of the acid remaining in the polymer. The uncombined water and suspended solids are then removed from the PTMEG-solvent mixture.

U.S. Pat. No. 2,751,419 discloses a process for the purification of PTMEG which had been produced via polymerization of THF in the presence of fluorosulfonic acid. The resulting sulfate esters are converted to PTMEG by a hydrolysis reaction accomplished by drowning the reaction mass in hot water under vigorous agitation or by continuous co-current drowning in a turbannular flow tube with steam as a propellant. Unreacted THF is removed from the hydrolyzed reaction mass by steam stripping, the maximum stripping temperature is 100° C. The THF-stripped hydrolyzed reaction mass is washed with water, preferably in a continuous countercurrent fashion and at a water to PTMEG ratio between 1:1 to 10:1, to remove a major portion of the HF and $H_2SO_4$. The remaining portion of HF and $H_2SO_4$ is neutralized by mixing the mass with an aqueous slurry of calcium hydroxide. The slurry, containing 5-15% calcium hydroxide, is mixed with the mass at a ratio of about 0.25 to 5.0 parts (preferably one part) $Ca(OH)_2$ to 100 parts PTMEG. The slurry-mass mixture temperature is approximately 80° C. The neutralized mass is filtered to remove the calcium hydroxide and other calcium salts. The residual water in the PTMEG is removed by evaporation, and the evaporation temperature is a maximum of 145° C.

SUMMARY OF THE INVENTION

The present invention is directed to a process for reducing fluoride levels in PTMEG by heating aqueous PTMEG having an undesired level of fluoride to a temperature in the range between about 200 and 300° C. for a period of time sufficient to reduce the fluoride content of the PTMEG.

DETAILED DESCRIPTION OF THE INVENTION

PTMEG produced by the polymerization of THF with a fluosulfonic acid catalyst typically has a fluoride concentration of between 80 and 600 ppm. The fluoride concentration refers to "end group" fluoride which is chemically bound to the PTMEG.

The preferred fluoride-reducing reaction of this invention is believed to be, but is not limited to, a "base catalyzed hydrolysis of the fluoride end groups". The reaction mechanism is believed to be:

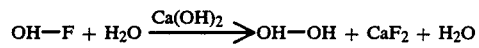

PTMEG having the undesired level of fluoride is preferably mixed with an aqueous alkali. However, the addition of the aqueous alkali is not always necessary as will become evident below. The mixture of PTMEG and aqueous alkali is heated to a temperature between about 200° C. and about 300° C. for a period of time sufficient to reduce the fluoride content of the PTMEG.

The aqueous alkali comprises water and either sodium hydroxide, calcium hydroxide, magnesium hydroxide, sodium carbonate, sodium borohydride, sodium formate and sodium acetate; preferably, the alkali is lime (i.e. calcium hydroxide). The aqueous alkali further comprises between about 5% and about 50% by weight of water and up to about 5% by weight of alkali (based on the total weight of the PTMEG and aqueous alkali). Alternately, the alkali concentration may range between about 0.05 and about 3.30% by weight. Preferably, the aqueous alkali comprises between about 10 and about 30% by weight water and between about 0.25 and about 0.45% by weight alkali.

The water of the aqueous alkali is extremely important to the reduction of fluoride in the PTMEG. A minimum concentration of 15% by weight is believed to be required to reduce the fluoride concentration to below 40 ppm. Generally, the higher the water concentration, at least up to about 25% by weight, the greater is the reduction in the fluoride concentration. When no water is present, fluoride reduction apparently does not take place even at a temperature of 300° C.

With regard to the alkali of the aqueous alkali, lime is preferred since it is most often used commercially to neutralize residual amounts of acid that may be present in PTMEG produced by polymerization of the THF. Therefore, in some instances, sufficient lime is already present in the PTMEG, so that one needs only heat the aqueous alkaline PTMEG to a temperature between about 200 and 300° C. Moreover, lime is not known to adversely affect PTMEG. Absence of lime causes depolymerization of the PTMEG due to the generation of HF, and its absence considerably slows the fluoride-reducing reaction. At lower reaction temperatures, the rate controlling step is the solubilization of the lime in the water. Therefore, the reaction appears to be slow, thus requiring a longer retention time to complete the reaction.

The mixture of PTMEG and aqueous alkali is heated to a temperature in the range between about 200° C. and 300° C., for a period of time up to about 12 hours. Alternatively, the mixture may be heated to a temperature between about 225° C. and 275° C. for a time between about 1 minute and about 8 hours. Preferably, the mixture is heated between about 240° C. and 250° C. for a time between about 1 minute and about 1.0 hours. With regard to the temperature and time, a temperature in excess of about 225° C. is apparently required to complete the reaction in a reasonable amount of time, because fluoride end groups are very stable and are difficult to remove. Under agitation (discussed below), the fluoride concentration (about 225 ppm) of PTMEG can be reduced to less than 40 ppm (at lime concentration of about 0.35% by weight and water concentration of about 25% by weight) by controlling the temperature and time as follows:

| Temperature (°C.) | Retention Time (Hours) |
|---|---|
| 200 | 7.00 |
| 225 | 4.00 |
| 235 | 3.00 |
| 250 | 0.50 |
| 275 | 0.00* |

*heating the reactants to 275° followed by immediate cooling.

Although 275° C. gives less than 40 ppm fluoride in 0 hours, the preferred temperature is in the range between about 240 AND 250° C., because a temperature in that range requires less expenditure of energy and is therefore less costly. Agitation of the reactants during heating is preferred because the greater the agitation, the greater the rate of fluoride reduction.

After the fluoride reduction reaction is completed, the product is dried at about 120° C. under vacuum of about 5-10 mm of Hg for about 2 hours. The suspended solids are removed by filtration.

With regard to the equipment necessary for the process, a jacketed, agitated, pressure vessel is preferred. The vessel preferably has a maximum temperature rating of about 600° F. and a maximum pressure rating of 900 psig. Also, the vessel should be provided with a nitrogen purge system, as it is preferred that the fluoride reduction reaction be performed in an inert atmosphere, as oxygen will discolor the product. Oxygen does not have an effect on the fluoride reduction.

The following Examples further support the invention disclosed herein, but are not to be considered limiting on the invention. In the following experimental tests, PTMEG having a pH of 7 and containing 200 ppm fluoride was used. In each test, the PTMEG, water and alkali were charged into a high pressure shaker tube. The contents of the tube were sparged with nitrogen to remove $O_2$ and heated for the specified length of time under autogenous pressure. The polymer was decanted from the water layer, dried at 120° C. under vacuum and then filtered.

| Example | Water % | Base | Base % | Time (hr) | Temp. (°C.) | Finish ppm F |
|---|---|---|---|---|---|---|
| 1 | 25 | Ca(OH)$_2$ | 3.8 | 2 | 300 | 25 |
| 2 | 25 | NaOH | 0.8 | 2 | 300 | 18 |
| 3 | 25 | None | 0.0 | 2 | 300 | 19 |
| 4 | 25 | Ca(OH)$_2$ | 3.8 | 2 | 200 | 160 |
| 5 | 25 | NaOH | 0.8 | 2 | 200 | 93 |
| 6 | 25 | None | 0.0 | 2 | 200 | 176 |
| 7 | 25 | Ca(OH)$_2$ | 0.4 | 4 | 200 | 81 |
| 8 | 25 | Ca(OH)$_2$ | 0.4 | 2 | 225 | 113 |
| 9 | 25 | Ca(OH)$_2$ | 3.0 | 4 | 250 | 10 |
| 10 | 25 | Ca(OH)$_2$ | 1.0 | 4 | 225 | 9 |
| 11 | 5 | Ca(OH)$_2$ | 3.0 | 4 | 225 | 200 |

The following is a tabulation of a set of experiments wherein the reaction was carried on without agitation. The fluoride values (F start and F finish) are in "ppm".

| Example | Lime % | Water % | Time (hr) | Temp. (°C.) | F Start | F Finish |
|---|---|---|---|---|---|---|
| 12 | 3.33 | 33 | 12 | 225 | 238 | 16 |
| 13 | 3.33 | 33 | 8 | 225 | 238 | 16 |
| 14 | 3.00 | 50 | 4 | 225 | 238 | 40 |
| 15 | 4.00 | 33 | 8 | 225 | 238 | 18 |
| 16 | 3.33 | 25 | 6 | 225 | 238 | 27 |
| 17 | 3.33 | 33 | 6 | 225 | 210 | 35 |
| 18 | 0.33 | 25 | 4 | 225 | 238 | 88 |
| Control | 0.33 | 25 | 4 | 150 | 238 | 234 |
| Control | 0.33 | 25 | 2 | 175 | 238 | 229 |
| Control | 0.33 | 25 | 2 | 150 | 238 | 250 |
| 19 | 0.33 | 25 | 6 | 225 | 238 | 81 |
| 20 | 0.33 | 25 | 4 | 200 | 238 | 189 |
| Control | 0.33 | 25 | 4 | 175 | 238 | 229 |
| Control | 0.33 | 25 | 8 | 150 | 238 | 218 |
| Control | 5.00 | 25 | 3 | 175 | 238 | 222 |
| 21 | 5.00 | 25 | 3 | 225 | 238 | 165 |
| 22 | 3.33 | 25 | 4 | 225 | 238 | 91 |
| 23 | 3.33 | 25 | 2 | 225 | 238 | 118 |
| 24 | 3.33 | 25 | 2 | 250 | 238 | 73 |

The present invention may be embodied in other specific forms without departing from the spirit of essential attributes thereof and, accordingly, reference should be made to the appended claims, rather than to the foregoing specification, as indicating the scope of the invention.

We claim:

1. In a process for preparing poly(tetramethylene ether) glycol (PTMEG) by polymerizing tetrahydrofuran in the presence of fluorosulfonic acid, hydrolyzing the resulting sulfate esters, washing and neutralizing the resulting acidic PTMEG composition so as to provide an aqueous PTMEG containing between about 80 and 600 ppm of fluoride, the improvement comprising heating said aqueous fluoride-containing PTMEG to a temperature in the range between about 200 and 300° C. for a period of time sufficient to reduce the fluoride content of said PTMEG.

2. The process of claim 1 wherein said PTMEG is agitated during heating.

3. The process of claim 1 wherein said PTMEG is heated to a temperature between about 225° C. and about 275° C.

4. The process of claim 1 wherein said PTMEG is heated to a temperature between about 240° C. and about 250° C.

5. The process of claim 1 wherein said heating of said PTMEG is carried out in the presence of an aqueous base.

6. The process of claim 5 wherein said aqueous base comprises between about 5% and about 50% by weight water and up to about 5% by weight base based on the total weight of the PTMEG and aqueous alkali.

7. The process of claim 6 wherein said aqueous base comprises between about 0.05% and about 3.30% by weight base.

8. The process of claim 6 wherein said aqueous base comprises between about 10% and about 30% by weight water and between about 0.25% and 0.45% by weight base.

9. The process of claim 5 wherein said aqueous base comprises water and sodium hydroxide, calcium hydroxide, magnesium hydroxide, sodium carbonate, sodium borohydride, sodium formate or sodium acetate.

10. The process of claim 5 wherein said aqueous base comprises water and lime.

11. In a process for preparing PTMEG by polymerizing THF in the presence of fluorosulfonic acid, hydrolyzing the resulting sulfate esters, washing and neutralizing the resulting acidic PTMEG composition so as to provide an aqueous PTMEG containing between about 80 and 600 ppm of fluoride, the improvement comprising heating said aqueous fluoride-containing PTMEG with agitation to a temperature in the range between about 225 and 275° C. in the presence of aqueous lime for a period of time, up to 12 hours, sufficient to reduce the fluoride content of the PTMEG.

12. The process of claim 11 wherein said aqueous lime comprises between about 5% and about 50% by weight water and up to about 5% by weight lime based on the total weight of the PTMEG and aqueous lime.

13. The process of claim 12 wherein said period of time is between about 1 minute and about 8 hours.

14. The process of claim 13 wherein said period of time is between about 1 minute and 1 hour.

15. The process of claim 12 wherein said aqueous lime comprises between about 0.05% and about 3.30% by weight lime.

16. The process of claim 15 wherein said period of time is between about 1 minute and about 8 hours.

17. The process of claim 16 wherein said period of time is between about 1 minute and 1 hour.

18. The process of claim 12 wherein said aqueous lime comprises between about 10% and about 30% by weight water and between about 0.25% and 0.4% by weight lime.

19. The process of claim 18 wherein said period of time is between about 1 minute and about 8 hours.

20. The process of claim 19 wherein said period of time is between about 1 minute and 1 hour.

* * * * *